United States Patent
Chen et al.

(10) Patent No.: US 11,704,131 B2
(45) Date of Patent: Jul. 18, 2023

(54) MOVING ENTRIES BETWEEN MULTIPLE LEVELS OF A BRANCH PREDICTOR BASED ON A PERFORMANCE LOSS RESULTING FROM FEWER THAN A PRE-SET NUMBER OF INSTRUCTIONS BEING STORED IN AN INSTRUCTION CACHE REGISTER

(71) Applicant: ALIBABA GROUP HOLDING LIMITED, Grand Cayman (KY)

(72) Inventors: Chen Chen, Shanghai (CN); Tao Jiang, Hangzhou (CN); Dongqi Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/994,052

(22) Filed: Aug. 14, 2020

(65) Prior Publication Data

US 2021/0089315 A1 Mar. 25, 2021

(30) Foreign Application Priority Data

Sep. 23, 2019 (CN) .......................... 201910901489.2

(51) Int. Cl.
*G06F 9/38* (2018.01)
*G06F 9/30* (2018.01)
*G06F 11/34* (2006.01)

(52) U.S. Cl.
CPC ........ *G06F 9/3806* (2013.01); *G06F 9/30047* (2013.01); *G06F 9/30058* (2013.01);
(Continued)

(58) Field of Classification Search
CPC .. G06F 9/3814; G06F 9/3806; G06F 9/30058; G06F 11/3466; G06F 9/30098;
(Continued)

(56) References Cited

U.S. PATENT DOCUMENTS

2004/0015683 A1* 1/2004 Emma ................... G06F 9/3806
712/240
2005/0210224 A1 9/2005 Col et al.
(Continued)

OTHER PUBLICATIONS

International Search Report and written opinion in related International Application No. PCT/US2020/046449, dated Nov. 10, 2020 (8 pgs.).

*Primary Examiner* — Shawn Doman
(74) *Attorney, Agent, or Firm* — Finnegan, Henderson, Farabow, Garrett & Dunner, LLP

(57) ABSTRACT

An instruction processing device and an instruction processing method are provided. The instruction processing device includes: a first-level branch target buffer, configured to store entries of a first plurality of branch instructions; a second-level branch target buffer, configured to store entries of a second plurality of branch instructions, wherein the entries in the first-level branch target buffer are accessed faster than the entries in the second-level branch target buffer; an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer; and an execution unit including circuitry configured to execute the first branch instruction.

14 Claims, 6 Drawing Sheets

(52) U.S. Cl.
CPC ........ *G06F 9/30098* (2013.01); *G06F 9/3814* (2013.01); *G06F 9/3844* (2013.01); *G06F 11/3466* (2013.01)

(58) Field of Classification Search
CPC ... G06F 9/30047; G06F 9/3804; G06F 9/3844

USPC .................................................. 712/238–240
See application file for complete search history.

(56) References Cited

U.S. PATENT DOCUMENTS

| | | | |
|---|---|---|---|
| 2008/0040592 A1* | 2/2008 | Vasekin | G06F 9/30181 712/238 |
| 2008/0276070 A1* | 11/2008 | Doing | G06F 9/3804 712/205 |
| 2013/0117535 A1 | 5/2013 | Venkumahanti et al. | |
| 2013/0339693 A1* | 12/2013 | Bonanno | G06F 9/3806 712/238 |
| 2015/0019849 A1* | 1/2015 | Bonanno | G06F 9/30145 712/238 |
| 2017/0132140 A1 | 5/2017 | Lin | |
| 2019/0265977 A1 | 8/2019 | Tvila et al. | |
| 2020/0004543 A1* | 1/2020 | Kumar | G06F 9/3806 |
| 2020/0310811 A1* | 10/2020 | Ishii | G06F 9/30058 |

* cited by examiner

MOVING ENTRIES BETWEEN MULTIPLE LEVELS OF A BRANCH PREDICTOR BASED ON A PERFORMANCE LOSS RESULTING FROM FEWER THAN A PRE-SET NUMBER OF INSTRUCTIONS BEING STORED IN AN INSTRUCTION CACHE REGISTER

CROSS REFERENCE TO RELATED APPLICATION

This disclosure claims the benefits of priority to Chinese application number 201910901489.2, filed Sep. 23, 2019, which is incorporated herein by reference in its entirety.

BACKGROUND

It is difficult to improve a processor architecture. Sometimes a good amount of effort may be made in research and development to make even a small progress. In the design of high-performance processors, pipeline bubbles may be reduced or eliminated from an instruction pipeline to improve a processor architecture.

SUMMARY OF THE DISCLOSURE

To achieve this objective, according to some embodiments of the present disclosure, the present disclosure provides an instruction processing device, including: a first-level branch target buffer, configured to store entries of a first plurality of branch instructions; a second-level branch target buffer, configured to store entries of a second plurality of branch instructions, wherein the entries in the first-level branch target buffer are accessed faster than the entries in the second-level branch target buffer; an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer, and an execution unit including circuitry configured to execute the first branch instruction.

In some embodiments, the instruction fetch unit or the execution unit includes circuitry configured to add the one or more entries corresponding to the first branch instruction into the second-level branch target buffer according to an execution result of the first branch instruction.

In some embodiments, the instruction fetch unit or the execution unit includes circuitry configured to update the one or more entries corresponding to the first branch instruction in the second-level branch target buffer according to an execution result of the first branch instructions.

In some embodiments, the instruction fetch unit further comprises circuitry configured to: when the one or more entries corresponding to the first branch instruction are not identified in the second-level branch target buffer or the first-level branch target buffer, enter a waiting state to wait for an execution result of the first branch instructions.

In some embodiments, the instruction fetch unit further includes circuitry configured to: determine whether there is a performance loss when an instruction stream similar to the first branch instruction is executed; and add the one or more entries corresponding to the first branch instruction into the first-level branch target buffer when it is determined that there is a performance loss when the instruction stream similar to the first branch instructions is executed.

In some embodiments, the instruction fetch unit further includes circuitry configured to determine whether there is a performance loss when an instruction stream similar to the first branch instruction is executed according to whether at least a pre-set number of instructions are stored in an instruction cache register.

In some embodiments, the first-level branch target buffer adopts a register structure such that entries are searched through a tag comprising a program pointer (PC); and the second-level branch target buffer uses a memory implemented with a multi-way set-associative structure and entries are searched using a hardware index comprising a PC to retrieve entries.

In some embodiments, the one or more entries of the first branch instruction comprise: a branch instruction address and a jump target address.

In some embodiments, the entries of the first plurality of branch instructions are contained in entries of the second plurality of branch instructions.

In some embodiments, for the first branch instruction, the instruction fetch unit simultaneously searches the second-level branch target buffer and the first-level branch target buffer.

According to some embodiments of the present disclosure, an instruction processing method is provided. The instruction processing method includes: for a first branch instruction, searching a first-level branch target buffer and a second-level branch target buffer, wherein entries in the first-level branch target buffer are accessed faster than entries in the second-level branch target buffer; in accordance with determining that one or more entries corresponding to the first branch instruction are identified in the second-level branch target buffer, adding the one or more entries corresponding to the first branch instruction into the first-level branch target buffer; and adding the one or more entries corresponding to the first branch instruction into the second-level branch target buffer according to an execution result of the first branch instruction.

In some embodiments, the instruction processing method further comprises: updating the one or more entries corresponding to the first branch instruction in the second-level branch target buffer according to the execution result of the first branch instructions.

In some embodiments, the adding the one or more entries corresponding to the first branch instruction into the first-level branch target buffer comprises: determining whether there is a performance loss when an instruction stream similar to the first branch instruction is executed; and in accordance with determining that there is a performance loss when the instruction stream similar to the first branch instruction is executed, adding the one or more entries corresponding to the first branch instruction into the first-level branch target buffer.

In some embodiments, the first-level branch target buffer adopts a register structure such that entries are searched through a tag comprising a PC; and the second-level branch target buffer uses a memory implemented with a multi-way set-associative structure and entries are searched using a hardware index comprising a PC to retrieve entries.

In some embodiments, the one or more entries of the first branch instruction comprise: a branch instruction address and a jump target address.

In some embodiments, the entries of the first plurality of branch instructions in the first-level branch target buffer are contained in the entries of the second plurality of branch instructions in the second-level branch target buffer.

In some embodiments, for the first branch instruction, the second-level branch target buffer and the first-level branch target buffer are simultaneously searched.

In some embodiments, the determining whether there is a performance loss when the instruction stream similar to the first branch instruction is executed comprises: determining whether there is a performance loss when the instruction stream similar to the first branch instruction is executed according to whether at least a pre-set number of instructions are stored in an instruction cache register.

Some embodiments of the present disclosure provide a computer system including the instruction processing device comprising a first-level branch target buffer, configured to store entries of a first plurality of branch instructions; a second-level branch target buffer, configured to store entries of a second plurality of branch instructions, wherein the entries in the first-level branch target buffer are accessed faster than the entries in the second-level branch target buffer; an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer; and an execution unit including circuitry configured to execute the first branch instruction.

Some embodiments of the present disclosure provide a system-on-chip including the instruction processing device comprising a first-level branch target buffer, configured to store entries of a first plurality of branch instructions; a second-level branch target buffer, configured to store entries of a second plurality of branch instructions, wherein the entries in the first-level branch target buffer are accessed faster than the entries in the second-level branch target buffer; an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer; and an execution unit including circuitry configured to execute the first branch instruction.

BRIEF DESCRIPTION OF THE DRAWINGS

The above and other objectives, features, and advantages of the present disclosure will be clearer by describing the embodiments of the present disclosure with reference to the following drawings. In the drawings.

DETAILED DESCRIPTION

Figure 1:
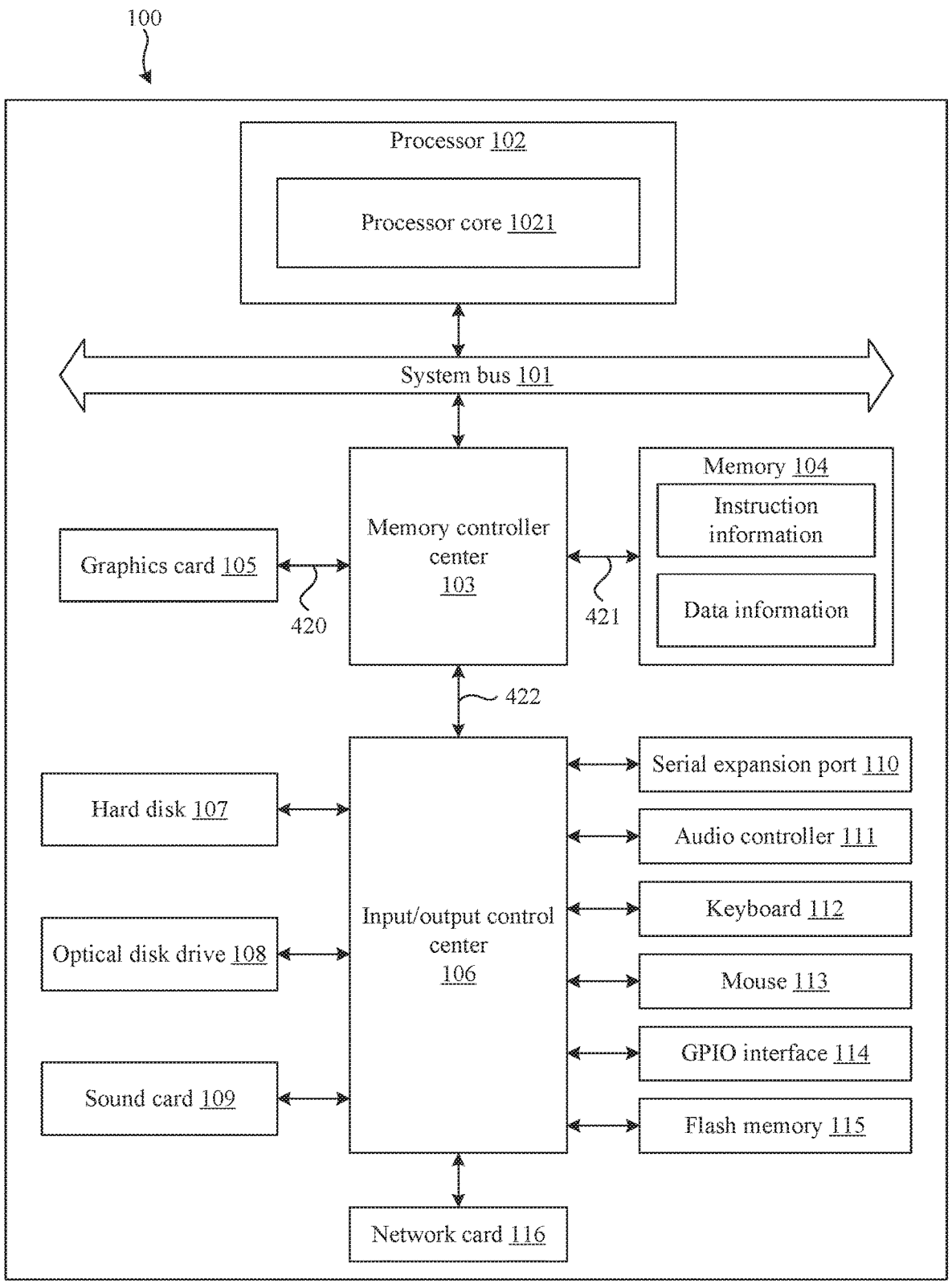
FIG. 1 is a schematic structural diagram of an example computer system according to some embodiments of the present disclosure.

The present disclosure is described below based on various embodiments, but the present disclosure is not limited to these embodiments. In the following detailed description of the present disclosure, some specific details are described in detail. Those skilled in the art can fully understand the present disclosure without the description of these details. In order to avoid confusion with the essence of the present disclosure, well-known methods, processes, and flows may not be described in detail. In addition, the drawings are not necessarily drawn to scale.

In an instruction pipeline structure, in order to reduce performance losses caused by branch instructions, a branch target buffer (BTB) structure can be introduced. The BTB structure may enable a processor to predict early on a jump direction and a jump target address of a branch instruction, thereby reducing the performance losses. In order to improve the prediction accuracy of the BTB, a large number of branch instruction entries may be stored in a memory. The branch instruction entries may include information such as jump directions and target addresses of the branch instructions. It may be difficult to immediately obtain a prediction result from such structure for accessing the BTB and determining the accessing result. There may include at least one pipeline bubble in the processor, thereby reducing the performance of the processor. In some embodiments, for an instruction sequence including continuous jumps, the continuous access to the BTB may insert a large number of pipeline bubbles, causing performance losses. Sometimes a decoupled micro BTB may be added, which stores a relatively small amount of information and less entries, so that a prediction result can be returned relatively fast, thereby eliminating the pipeline bubbles caused by accessing to a main BTB. However, due to the simple structure of the decoupled micro BTB, the prediction accuracy is low, thus inevitably causing performance losses.

The embodiments of the present disclosure have the advantages that, because read and write performance of the first-level branch buffer is better than that of the second-level branch buffer, the instruction fetch unit adds the entries corresponding to the first branch instruction from the second-level branch buffer into a first branch predictor, so as to subsequently improve the read and write performance when executing instruction streams similar to the first branch instruction.

In some embodiments, the instruction fetch unit determines whether there may be performance loss when executing instruction streams similar to the first branch instruction this time or in the future. When there is such a performance loss, the entries corresponding to the first branch instruction are added from the second-level branch target buffer the first branch predictor, so as to reduce the possibility of future performance loss when executing instruction streams similar to the first branch instruction subsequently.

In some embodiments, an instruction packet is a fixed-length binary segment acquired by a processor from an instruction cache or an external bus.

In some embodiments, an instruction cache is a level-1 cache configured to store some or all instructions.

In some embodiments, an instruction pipeline is a way of dividing an operation of an instruction into multiple small steps to improve the efficiency of executing instructions by a processor. Each step can be completed by a specialized circuit or circuitry. Some examples of instruction pipelines include three-stage, four-stage, five-stage, seven-stage, or super instruction pipelines, etc. For example, a five-stage instruction pipeline includes an instruction fetch stage, a decoding stage, an execution stage, a memory access stage, and a write-back stage. In the present disclosure, the instruction fetch stage, the decoding stage, the execution stage, the memory access stage, and the write-back stage may be referred to as an instruction fetch unit, a decoding unit, an execution unit, a memory access unit, and a retirement unit, respectively. A combination of software and hardware that implements the instruction pipeline may be referred to as a pipeline structure.

In some embodiments, a branch target buffer (BTB) stores one or more entries of the most recently executed branch instruction. A processor can compare a current branch instruction with the entries in the BTB, so as to obtain a jump direction and a jump target address of the branch instruction earlier.

In some embodiments, a pipeline bubble refers to a failure to execute any instruction at a certain stage in a pipeline.

In some embodiments, Program PC may refer to a program pointer.

In some embodiments, an entry is a group of associated data items.

In some embodiments, a Translation Lookaside Buffer (TLB): is a memory management unit, such as a cache configured to improve a translation speed from a virtual address to a physical address.

FIG. 1 is a schematic structural diagram of an example computer system 100 according to some embodiments of the present disclosure. For example, the processing system as described herein is a computer system. Referring to FIG. 1, system 100 is an example of a "central" system architecture. System 100 may be constructed based on various types of processors currently on the market and may be driven by operating systems such as a WINDOWS™ operating system version, a UNIX operating system, and a Linux operating system, etc. In addition, system 100 is generally implemented in a PC, a desktop, a notebook, or a server.

In some embodiments, as shown in FIG. 1, system 100 includes a processor 102. Processor 102 has a data processing capability known in the art. It can be a processor with a complex instruction set (CISC) architecture, a reduced instruction set (RISC) architecture, and a very long instruction word (VLIW) architecture, or a processor that implements a combination of the above instruction sets, or any purpose-built processor device.

In some embodiments, processor 102 is coupled to system bus 101, and system bus 101 can transmit data signals between processor 102 and other components. In some embodiments, processor 102 further includes a processor core 1021 improved according to some embodiments of the present disclosure, and specific details thereof will be provided below.

In some embodiments, system 100 further includes memory 104 and a graphics card 105. Memory 104 may be a dynamic random access memory (DRAM) device, a static random access memory (SRAM) device, a flash memory device, or other memory devices. Memory 104 may store instruction information or data information represented by data signals. In some embodiments, graphics card 105 includes a display driver configured to control correct display of display signals on a display screen.

In some embodiments, graphics card 105 and memory 104 are coupled to system bus 101 via a memory controller center 103. Processor 102 may communicate with memory controller center 103 via system bus 101. In some embodiments, memory controller center 103 provides a high-bandwidth memory access path 421 to memory 104 for storing and reading instruction information and data information. At the same time, memory controller center 103 and graphics card 105 can transmit display signals based on a graphics card signal input/output interface 420. In some embodiments, graphics card signal input/output interface 420 is of, for example, an interface type such as DVI and HDMI.

In some embodiments, memory controller center 103 not only transmits digital signals between processor 102, memory 104, and graphics card 105, but also realizes bridging of digital signals between system bus 101 and memory 104 as well as an input/output control center 106.

In some embodiments, system 100 further includes input/output control center 106 that is coupled to memory controller center 103 through dedicated hub interface bus 422. In some embodiments, some I/O devices are connected to input/output control center 106 via a local I/O bus. The local I/O bus may be configured to couple peripheral devices to input/output control center 106, and then to memory controller center 103 and system bus 101. In some embodiments, the peripheral devices include, but are not limited to, a hard disk 107, an optical disk drive 108, a sound card 109, a serial expansion port 110, an audio controller 111, a keyboard 112, a mouse 113, a GPIO interface 114, a flash memory 115, or a network card 116.

It is appreciated that different computer systems may have different structural diagrams depending on different motherboards, operating systems, or instruction set architectures. For example, some computer systems may integrate memory controller center 103 into processor 102, so that input/output control center 106 becomes a control center coupled to processor 102.

Figure 2:
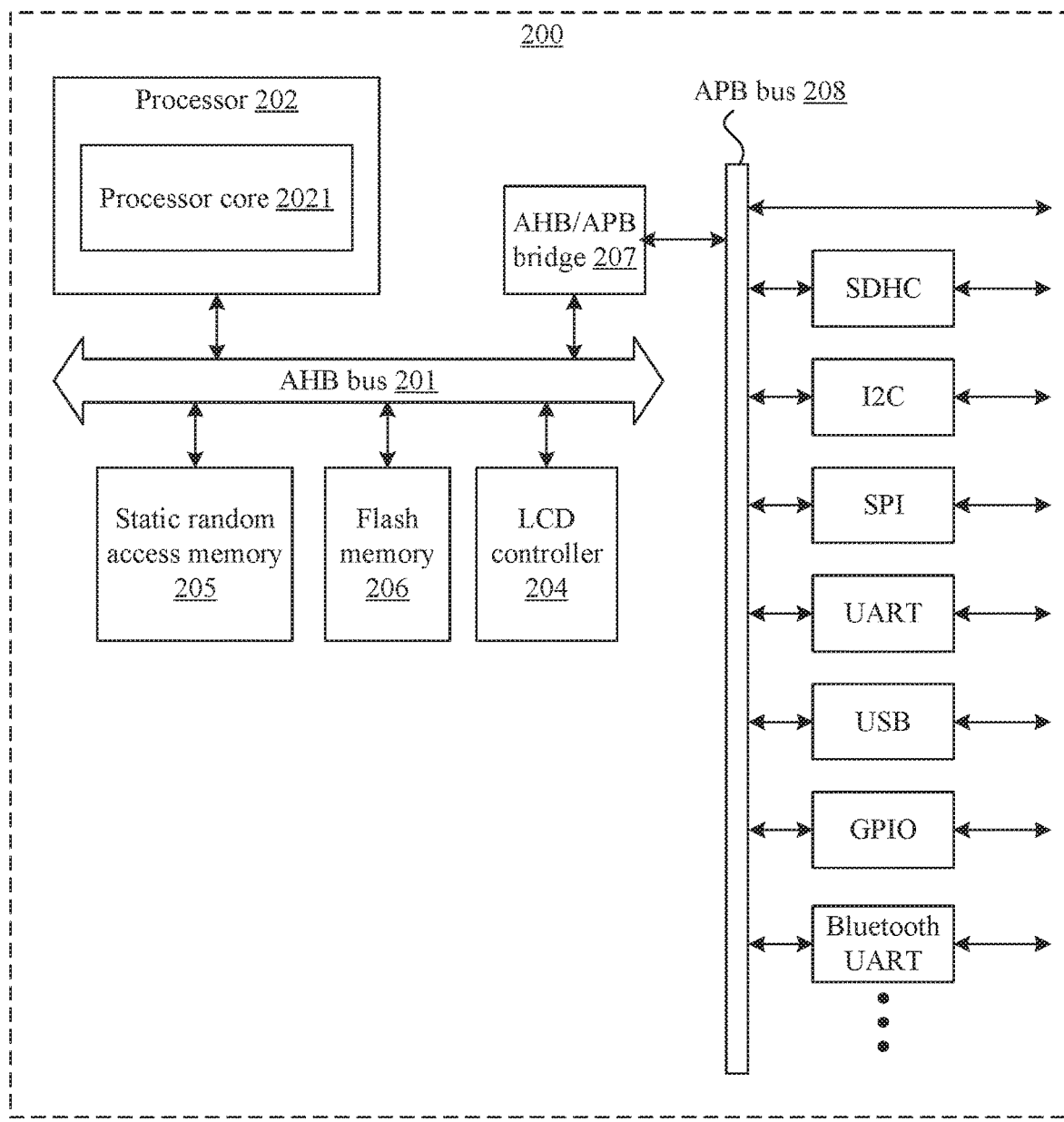
FIG. 2 is a schematic structural diagram of an example system-on-chip according to some embodiments of the present disclosure.

FIG. 2 is a schematic structural diagram of an example system-on-chip 200 (e.g., also referred to as "system 200") according to some embodiments of the present disclosure. As a system-on-chip, system 200 may be produced and sold as an independent device, or may be combined with other components to form a new device for production and sale.

In some embodiments, system 200 may be manufactured using various types of processors and may be driven by operating systems such as WINDOWS™, UNIX, Linux, Android, RTOS, and so on. System 200 may be implemented in computer devices, handheld devices, or embedded products. Some examples of handheld devices may include cellular phones, Internet protocol devices, digital cameras, personal digital assistants (PDA), or handheld PCs. Embedded products may include network computers (NetPC), set-top boxes, network hubs, wide area network (WAN) switches, or any other system that can execute one or more instructions.

In some embodiments, referring to FIG. 2, system 200 includes a processor 202, a static random access memory 205, an LCD controller 204, a flash memory 206, and an AHB/APB bridge 207 coupled via an Advanced High performance Bus (AHB) 201.

In some embodiments, processor 202 may be one of a complex instruction set (CISC) microprocessor, a reduced instruction set (RISC) microprocessor, a very long instruction word (VLIW) microprocessor, a microprocessor that implements a combination of one or more of the above instruction sets, or any other processor device. Processor 202 may further include a processor core 2021 improved according to some embodiments of the present disclosure, and specific details thereof will be provided below.

In some embodiments, static random access memory 205 and flash memory 206 are configured to store instruction information or data information represented by digital signals. For example, static random access memory 205 may be used as a running space for various applications, and may create heaps stacks or store intermediate data for various applications. Flash memory 206 may store executable code of various applications or executable code of the operating system.

In some embodiments, AHB 201 is configured to transmit digital signals between high-performance modules of system 200, for example, transmitting digital signals between processor 202 and static random access memory 205, between processor 202 and LCD controller 204, between processor 202 and flash memory 206, and between processor 202 and AHB/APB bridge 207.

In some embodiments, AHB/APB bridge 207 is configured to bridge data transmission between the AHB and an APB 208. For example, AHB/APB bridge 207 may generate selection signals of APB peripheral devices by latching addresses, data, and control signals from the AHB and providing secondary decoding, thereby realizing the conversion from an AHB protocol to an APB protocol.

In some embodiments, system 200 may further include various interfaces coupled to the APB 208. The various interfaces include, but are not limited to, the following interface types: high-capacity SD memory card (SDHC, Secure Digital High Capacity), I2C bus, Serial Peripheral Interface (SPI), Universal Asynchronous Receiver/Transmitter (UART), Universal Serial Bus (USB), General-purpose input/output (GPIO), and Bluetooth UART. In some embodiments, peripheral devices coupled to the interfaces are, for example, USB devices, memory cards, message transceivers, Bluetooth devices, and so on.

It is appreciated that as the complexity of the SoC design increases and the processing power of processors continues to increase, the limitation of the performance of a bus structure has caused the bus structure to be upgraded. For example, ARM has introduced an Advanced eXtensible Interface (AXI) bus with higher performance on the basis of the AHB bus as described above. Therefore, an AXI bus may be used to replace AHB bus 201 in FIG. 2. As such, AHB bus is shown in FIG. 2 for illustrative purpose and is not intended to be limiting. Various types of bus structures may be used in the SoC.

Further, for the systems shown in FIGS. 1 and 2, it is appreciated that that these systems are only used to exemplify some application scenarios of the embodiments of the present disclosure, and are not intended to limit the embodiments of the present disclosure. The improved processors or processor cores in some embodiments of the present disclosure can be applied to systems with any processor architecture and instruction set architecture.

Figure 3:
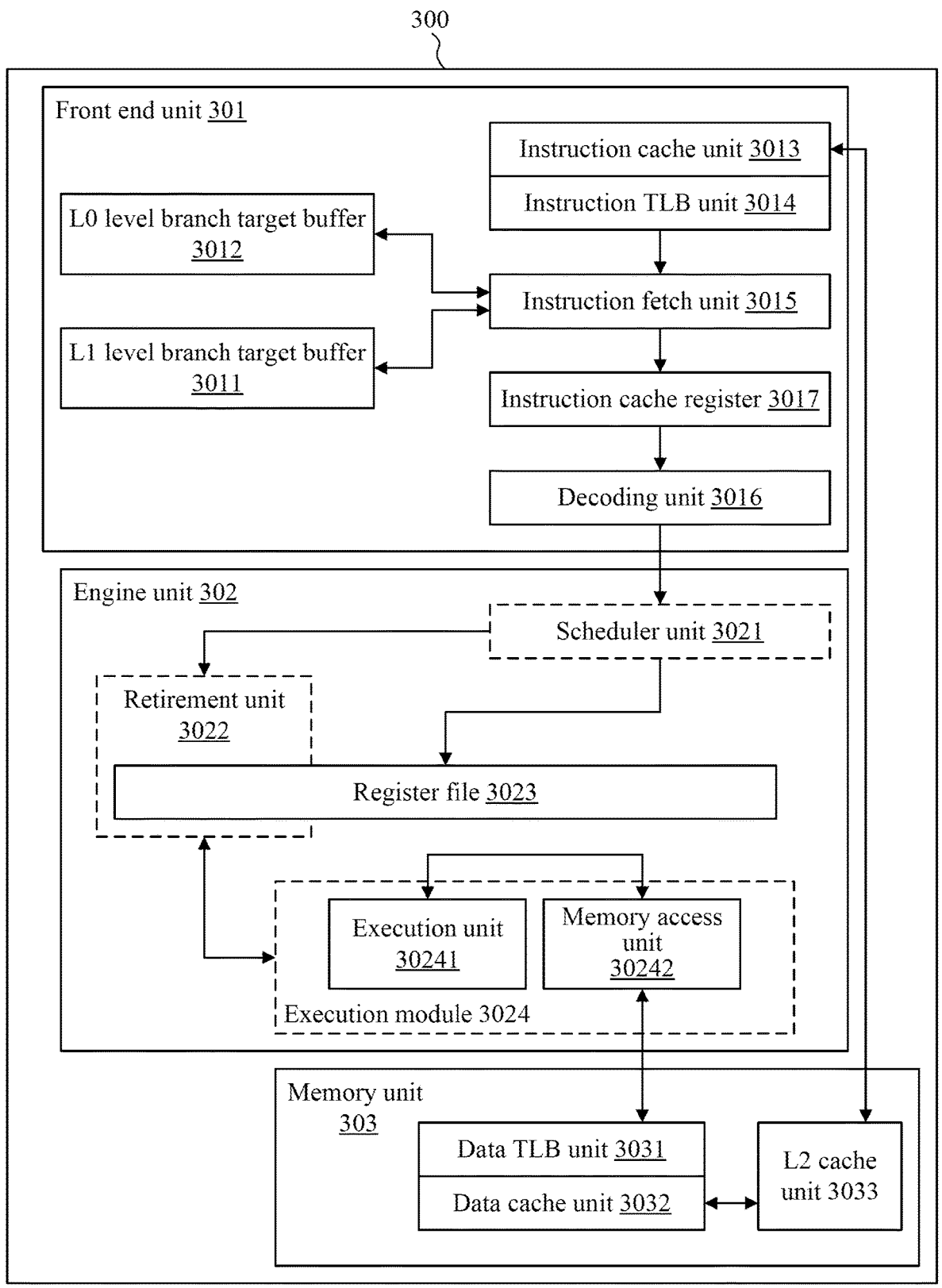
FIG. 3 is a schematic structural diagram of an example processor core according to some embodiments of the present disclosure.

FIG. 3 is a schematic structural diagram of an example processor core 300 according to some embodiments of the present disclosure. In FIG. 3, arrows indicate coupling relations between two or more units and data transmission directions between two units.

Figure 4:
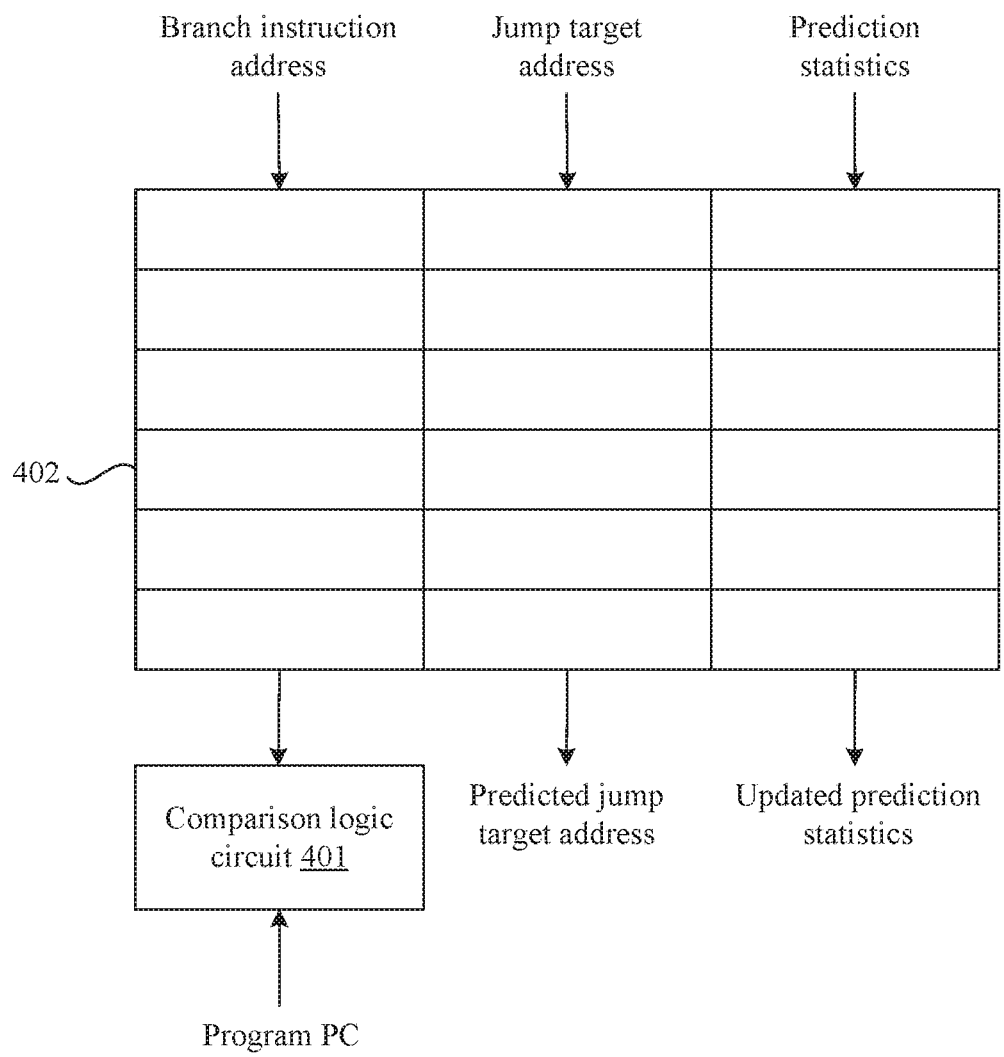
FIG. 4 illustrates an example logic of accessing and updating a branch target buffer using an example single branch target buffer according to some embodiments of the present disclosure.

FIG. 4 illustrates an example logic of accessing and updating a branch target buffer using an example single branch target buffer 400 according to some embodiments of the present disclosure. As shown in FIG. 4, single branch target buffer 400 includes a plurality of stored entries 402 and a comparison logic circuit 401 (e.g., comparison logic circuit 401 may be included in the branch target buffer). In some embodiments, entries 402 include address information (as unique index), jump target addresses, and prediction statistics fields of multiple branch instructions that have been executed. When a fetch unit initiates a search, a program PC of a current branch instruction is input to comparison logic circuit 401. Comparison logic circuit 401 can compare the program PC with information in entries 402. When there is a match, comparison logic circuit 401 obtains a jump target address from entries 402 as a predicted jump target address of the current branch instruction. Then the jump target addresses and the prediction statistical fields of entries 402 may be updated according to an execution result of the current branch instruction.

Referring back to FIG. 3, in some embodiments, processor core 300 includes a front-end unit 301, an engine unit 302, and a memory unit 303 coupled to a system 300.

In some embodiments, front-end unit 301 includes an instruction cache unit 3013, an instruction translation lookaside buffer TLB unit 3014, an instruction fetch unit 3015, and a decoding unit 3016 that are coupled to each other. Instruction cache unit 3013 may be further coupled to a level-2 (L2) cache unit 3033 in memory unit 303 to facilitate the transmission of instruction data.

In some embodiments, front-end unit 301 further includes L1 level branch target buffer 3011 and L0 level branch target buffer 3012 that are respectively coupled to instruction fetch unit 3015. L0 level branch target buffer 3012 and L1 level branch target buffer 3011 may both store entries of branch instructions. The read and write performance of L0 level branch target buffer 3012 may be better than that of L1 level branch target buffer 3011. Instruction fetch unit 3015 may determine whether there is a performance loss when executing an instruction stream similar to the current branch instruction at this time or in the future. The determination result can be used as a condition for determining whether to add an entry to L0 level branch target buffer 3012.

In some embodiments, instruction fetch unit 3015 obtains a physical address from instruction TLB unit 3014 according to a program PC, and obtains an instruction packet from instruction cache 3013 accordingly. The obtained instruction packet can be pre-decoded. Based on the pre-decoding result, when it is determined that the instruction packet includes a branch instruction, L1 level branch target buffer 3011 and L0 level branch target buffer 3012 are searched according to a program PC of the branch instruction, so as to obtain a target jump address. There may be multiple possibilities for searching L1 level branch target buffer 3011 and L0 level branch target buffer 3012 as described below.

In some embodiments, when the branch instruction is identified in L0 level branch target buffer 3012, instruction fetch unit 3015 no longer waits for a research result from searching L1 level branch target buffer 3011. Instead, an instruction packet can be obtained from instruction cache 3013 according to a target jump address retrieved from L0 level branch target buffer 3012. Then, the above steps of instruction fetching, pre-decoding, and searching L1 level branch target buffer 3011 and L0 level branch target buffer 3012 to obtain a target jump address are repeated.

In some embodiments, when the branch instruction is identified in L1 level branch target buffer 3011, instead of in L0 level branch target buffer 3012, instruction fetch unit 3015 determines whether there may be a performance loss when an instruction stream similar to the current branch instruction is executed at this time or in the future. When there may be a performance loss, the entry of the current branch instruction is updated to L0 level branch target buffer 3012.

In some embodiments, when the branch instruction cannot be identified in L0 level branch target buffer 3012 or L1 level branch target buffer 3011, instruction fetch unit 3015 determines whether there may be a performance loss when an instruction stream similar to the current branch instruction is executed at this time or in the future. When there may be a performance loss, the entry of the current branch instruction is updated to L0 level branch target buffer 3012.

In the above embodiments when the branch instruction is identified in L1 level branch target buffer 3011 or the branch instruction cannot be identified in L0 level branch target buffer 3012 or L1 level branch target buffer 3011, when an instruction stream similar to the current branch instruction is executed next time, instruction fetch unit 3015 may obtain the entry of the current branch instruction by searching L0 level branch target buffer 3012. Because the read and write performance of L0 level branch target buffer 3012 is better than that of L1 level branch target buffer 3011, the entry of the current branch instruction can be obtained more quickly from L0 level branch target buffer 3012, reducing the possibility of performance losses.

In some embodiments, L1 level branch target buffer 3011 uses a memory and can be implemented as a multi-way set-associative structure, including entries for hardware index search based on a program PC. The access speed may be slow. In some embodiments, L0 level branch target buffer 3012 uses storage with a structure such as a register or other structures e.g., such as content addressable memory (CAM) structure, and can search for entries via a tag (TAG) including a program PC, thereby making the access speed faster.

In some embodiments, a method for determining whether there may be a performance loss when an instruction stream similar to the current branch instruction is executed at this time or in the future includes: making such determination according to the number of instructions in a cache. Between the units of an instruction pipeline, an instruction cache register 3017 may be provided. For example, instruction cache register 3017 may be provided between instruction fetch unit 3015 and decoding unit 3016. Instruction fetch unit 3015 can store a plurality of pre-decoded instructions in the instruction cache register 3017. Decoding unit 3016 can fetch instructions from the instruction cache register 3017 for decoding. The number of instructions in the instruction cache register 3017 may be kept at at least a pre-set numerical value (e.g., greater than or equal to the pre-set numerical value) to ensure that decoding unit 3016 or execution unit 30241 does not need to wait before executing the instructions. As such, when the number of the instructions is fewer than the pre-set numerical value, it can be determined that there may be a performance loss when an instruction stream similar to the current branch instruction is executed in the future.

In some embodiments, decoding unit 3016 may decode instructions according to an instruction set architecture to determine what operations the instructions correspond to, and how the instruction pipeline processes the instructions. In some embodiments, the instruction set architecture is determined by a processor manufacturer. When a program is compiled into an executable form, a compiler uses instructions defined in the instruction set architecture to organize executable codes. If the compiler uses an undefined instruction, decoding unit 3016 cannot understand the meaning of the undefined instruction, and the instruction decoding fails.

In some embodiments, decoding unit 3016 may be further coupled to a scheduler unit 3021 in engine unit 302. Engine unit 302 may include scheduler unit 3021, a retirement unit 3022, a register file unit 3023, and an execution module 3024 that are coupled to each other. Scheduler unit 3021 may be coupled to register file unit 3023. Scheduler unit 3021 may schedule a plurality of instructions in the instruction pipeline, for example, adjusting the order of instruction execution in the instruction pipeline (e.g., out-of-order execution, etc.), or routing one instruction to a plurality of execution units at the same time. In some embodiments, decoding unit 3016 and scheduler unit 3021 may also be combined into one unit.

In some embodiments, register file unit 3023 represents one or more physical register files. Different physical register files may store one data type or different data types (for example, scalar integer, scalar floating point, packed integer, packed floating point, or vector integer, vector floating point, etc.), or status (such as an instruction PC of a next instruction), etc. In some embodiments, register file unit 3023 may be covered by retirement unit 3022 to implement multiple ways of register renaming and out-of-order execution.

Examples of registers in the physical register file include, but may not be limited to, dedicated physical registers, dynamically allocated physical registers using register renaming, or combinations of dedicated physical registers and dynamically allocated physical registers, etc.

In some embodiments, retirement unit 3022 and physical register file unit 3023 may be coupled to execution module 3024. In some embodiments, execution module 3024 includes one or more execution units 30241 and one or more memory access units 30242. Each execution unit 30241 may perform operations (e.g., shift, addition, subtraction, or multiplication) corresponding to one type of data. Memory access units 30242 may be coupled to memory unit 303. In some embodiments, memory unit 303 may include data TLB unit 3031 coupled to data cache unit 3032, where data cache unit 3032 is coupled to L2 level cache unit 3033. L2 cache unit 3033 may further be coupled to one or more caches of other levels (not shown), and eventually coupled to a main memory (e.g., static random access memory 205 in FIG. 2).

In some embodiments, for the current branch instruction, execution module 3024 can directly update L1 level branch target buffer 3011 according to an actual execution result of the current branch instruction. When the current branch instruction is executed by execution unit 30241, three types of results may occur, including: a first case where an actual execution result of the current branch instruction is the same as a prediction obtained by instruction fetch unit 3015 according to the branch target buffer, indicating that the prediction is a match; a second case where the actual execution result of the current branch instruction is different from the prediction obtained by instruction fetch unit 3015 according to the branch target buffer, indicating that the prediction is not a match, and accordingly, execution unit 30241 updates the corresponding entries in L1 level branch target buffer 3011 according to the actual execution result of the current branch instruction; and a third case where the entry of the current branch instruction is not stored in L1 level branch target buffer 3011 or L0 level branch target buffer 3012, indicating that there is no prediction, and accordingly, execution unit 30241 adds an entry to L1 level branch target buffer 3011 according to the actual execution result of the current branch instruction.

Alternatively, execution module 3024 may not directly update the entries in L1 level branch target buffer 3011. Instead, execution unit 30241 may send the actual execution result of the current branch instruction to instruction fetch unit 3015, and instruction fetch unit 3015 adds an entry to L1 level branch target buffer 3011 or updates one or more existing entries in L level branch target buffer 3011.

It is appreciated that instruction cache unit 3012, data cache unit 3032, and L2 cache unit 3033 are shown in FIG. 3 for illustrative purpose and do not intend to be limiting. One or more caches or cache units may be inside the core, outside the core, or partially inside the core and partially outside the core, or in different combinations in other embodiments. It is further appreciated that although the embodiments of the processor may include separate instructions and data cache units and a shared L2 cache unit, other embodiments may have a single internal cache for both instructions and data. In some embodiments, the system may include a combination of an internal cache and an external cache outside the core or processor. In other embodiments, all caches may be outside the core or processor.

It is appreciated that although instruction fetch unit 3015, decoding unit 3016, scheduler unit 3021, execution unit 30241, memory access unit 30242, and retirement unit 3022 in FIG. 3 are used to implement the instruction pipeline structure, the present disclosure is not intended to be limiting. A person skilled in the art may use other instruction pipelines, such as a standard five-stage pipeline structure, etc., to implement the embodiments of the present disclosure, which are included in the scope of the present disclosure.

Figure 5:
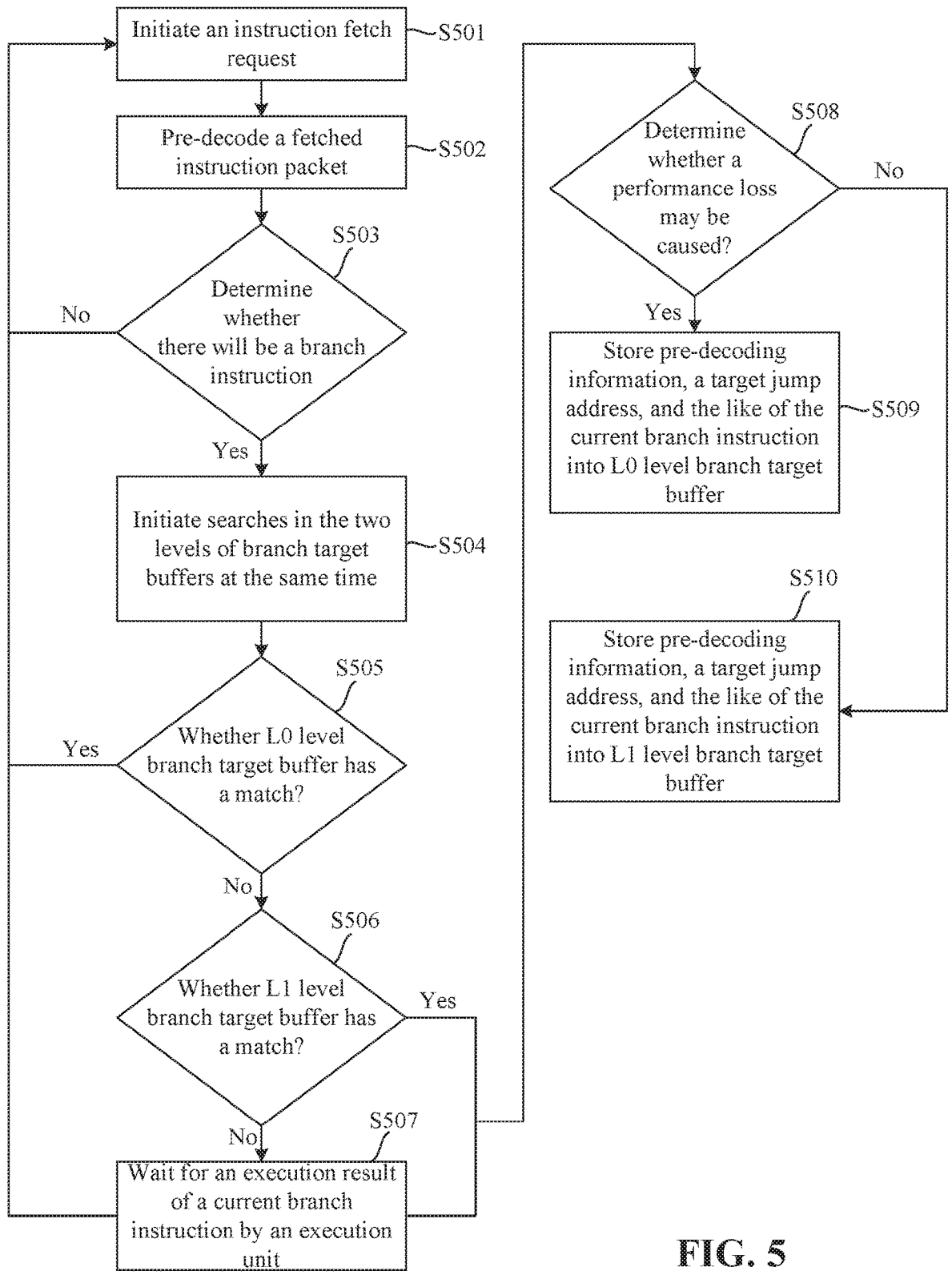
FIG. 5 is an example flowchart showing a process of updating two levels of branch target buffers performed by an instruction fetch unit, according to some embodiments of the preset disclosure.

FIG. 5 is a flowchart showing an example process 500 of updating two levels of branch target buffers (e.g., L0 level branch target buffer 3012, L1 level branch target buffer 3011) performed by an instruction fetch unit (e.g., instruction fetch unit 3015), according to some embodiments of the preset disclosure. As shown in FIG. 5, the process may include the following steps.

In step S501, an instruction fetch request is initiated.

In step S502, a fetched instruction packet is pre-decoded, for example, by instruction fetch unit 3015.

In step S503, whether there will be a branch instruction is determined, for example, by instruction fetch unit 3015. If there is a branch instruction (yes), the process proceeds to S504. If there is no branch instruction (no), process 500 does not apply, and step S503 proceeds back to step S501.

In step S504, searches in the two levels of branch target buffers are initiated at the same time, for example, by instruction fetch unit 3015. For example, L0 level branch target buffer 3012 and L1 level branch target buffer 3011 are searched at the same time according to a program PC of the current branch instruction. In some embodiments, L0 level branch target buffer 3012 and L1 level branch target buffer 3011 are searched to check whether prediction obtained therefrom by instruction fetch unit 3015 matches an actual execution result of the current branch instruction.

In step S505, it is determined, for example, by instruction fetch unit 3015, whether L0 level branch target buffer 3012 includes a match. If there is a match (yes), the process proceeds back to step S501. If there is no match (no), the process proceeds to step S506. Because the search performance of L0 level branch target buffer 3012 is better than that of L1 level branch target buffer 3011, L0 level branch target buffer 3012 may return a search result faster. If a target jump address is retrieved from L0 level branch target buffer 3012, the process may jump to step S501 to proceed with obtaining (or fetching) instructions from the target jump address (e.g., S501), decoding the instructions (e.g., S502), and determining whether there is a branch instruction (e.g., S503).

When there is no match in L0 level branch target buffer 3012, in step S506, it is determined, for example, by instruction fetch unit 3015, whether L1 level branch target buffer has a match. If L1 level branch target buffer 3011 does not include a match (no), step S507 is executed. If L1 level branch target buffer 3011 includes a match (yes), step S508 is executed.

In step S507, an actual execution result of the current branch instruction by execution unit 30241 is waited.

As shown in FIG. 5, two parallel execution streams can be generated (e.g., by instruction fetch unit 3015) after step S507. On a first execution stream, instruction fetch unit 3015 obtains an actual execution result of the current branch instruction performed by execution unit 30241, so an actual jump address of the current branch instruction in the actual execution result can be obtained. The process may jump to step S501 to proceed with obtaining (or fetching) instructions from the target jump address (e.g., S501), decoding the instructions (e.g., S502), and determining whether there is a branch instruction (e.g., S503).

On a second execution stream, process 500 proceeds to step S508 where instruction fetch unit 3015 determines whether there will cause a performance loss when an instruction stream similar to the current branch instruction is executed this time or in the future. Instruction fetch unit 3015 then updates L0 level branch target buffer 3012 or L1 level branch target buffer 3011 according to the result.

Following the second execution stream at step S508, it is determined, for example, by instruction fetch unit 3015, whether a performance loss may be caused. For example, when the current branch instruction is stored in L1 level branch target buffer 3011, it is determined whether a performance loss will be caused when an instruction stream similar to the current branch instruction is executed this time or in the future.

When it is determined that there will be performance loss (yes), step S509 is executed. In step S509, information of the current branch instruction, such as pre-decoding information, the target jump address, etc., can be stored in L0 level branch target buffer 3012.

When it is determined that there will not be performance loss (no) at step S508, step S510 is executed. In step S510, information of the current branch instruction, such as pre-decoding information, the target jump address, etc., can be stored in L1 level branch target buffer 3011.

Information of steps S509 and S510 may be obtained from execution unit 30241. For example, execution unit 30241 may transmit the actual execution result of the current branch instruction to instruction fetch unit 3015. The information may also come from other cache locations. As described above, based on an actual execution result, execution unit 30241 can directly add an entry to L1 level branch target buffer 3011, or update one or more existing entries in L1 level branch target buffer 3011.

Figure 6:
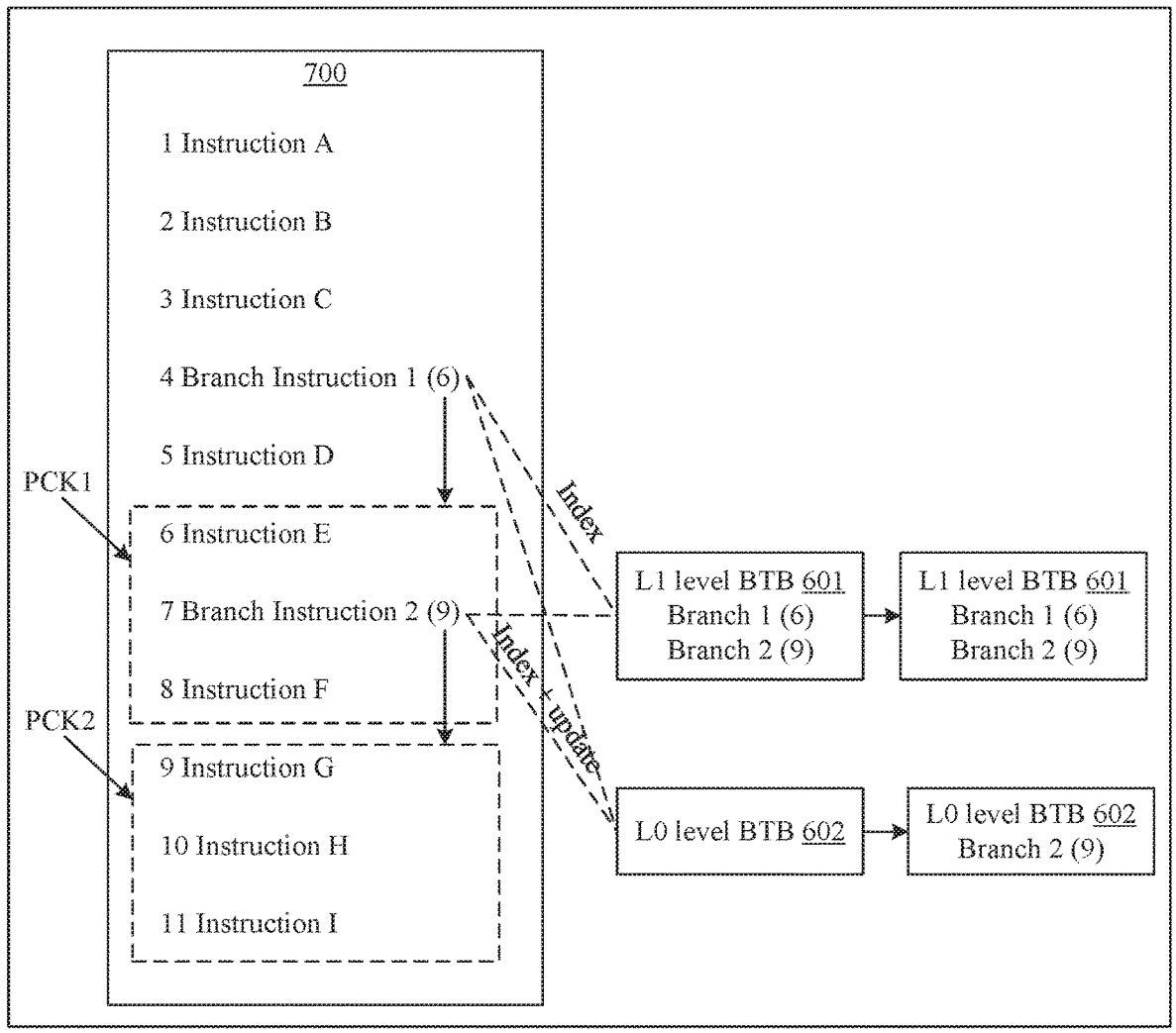
FIG. 6 is an example instruction sequence including multiple consecutive branch instructions, according to some embodiments of the present disclosure.

FIG. 6 is an example instruction sequence 700 including multiple consecutive branch instructions, according to some embodiments of the present disclosure. As shown in FIG. 6, instruction sequence 700 contains instructions 1-11. For example, instruction with a sequence number 4 is branch instruction 1, and its corresponding jump target address is an instruction with a position of sequence number 6. Instruction with a sequence number 7 is branch instruction 2, and its corresponding jump target address is an instruction with a position of sequence number 9. In addition, two connected branch target buffers are adopted in FIG. 6 to indicate changes in entries in the branch target buffers. First, L1 level branch target buffer (BTB) 601 and L0 level branch target buffer (BTB) 602 are searched according to a program PC of branch instruction 1 to obtain a predicted target jump address, to jump to the position of PCK1. Then an instruction packet is fetched from the position of PCK1 and decoded to obtain branch instruction 2. Then L0 level branch target buffer 602 and L1 level branch target buffer 601 are searched according to a program PC of branch instruction 2. The position of PCK2 is jumped to according to the predicted target jump address, and an instruction packet is fetched and decoded. Since branch instruction 2 is not identified from L0 level branch target buffer 602, according to a determination that there may be a performance loss, an entry of branch instruction 2 is updated to L0 level branch target buffer 602.

In some embodiments of the present disclosure, because the read and write performance of the L0 level branch target buffer is better than that of the L1 level branch target buffer, entries that may have performance losses are stored in the L0 level branch target buffer, so that target jump addresses of branch instructions may be obtained from L0 level branch target buffer more quickly, and an instruction packet can be obtained accordingly, thereby reducing the possibility of a performance loss when a similar instruction stream is executed next time.

The present disclosure may be implemented in hardware or dedicated circuits, software, logic, or any combination thereof. An existing chip may contain L1 level branch target buffer. Accordingly, L0 level branch target buffer may be added, and the hardware logic of an instruction fetch unit can be modified to implement the various embodiments of the present disclosure. Existing components in the instruction fetch unit may be reused or combined, and other hardware logic can be added. It is appreciated that the present disclosure is not intended to be limiting. The device and method described herein may further be reconstructed by hardware, software, back members, dedicated circuits or logic, general-purpose hardware or controller or other computing devices, or some combinations thereof. If involved, the circuit design of the present disclosure can be implemented in various components such as an integrated circuit module.

The embodiments may further be described using the following clauses:

1. An instruction processing device, comprising:
    a first-level branch target buffer, configured to store entries of a first plurality of branch instructions;
    a second-level branch target buffer, configured to store entries of a second plurality of branch instructions, wherein the entries in the first-level branch target buffer are accessed faster than the entries in the second-level branch target buffer;
    an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer; and
    an execution unit including circuitry configured to execute the first branch instruction.

2. The instruction processing device according to clause 1, wherein the instruction fetch unit or the execution unit includes circuitry configured to add the one or more entries corresponding to the first branch instruction into the second-level branch target buffer according to an execution result of the first branch instruction.

3. The instruction processing device according to clause 1, wherein the instruction fetch unit or the execution unit includes circuitry configured to update the one or more entries corresponding to the first branch instruction in the second-level branch target buffer according to an execution result of the first branch instructions.

4. The instruction processing device according to clause 2, wherein the instruction fetch unit further comprises circuitry configured to: when the one or more entries corresponding to the first branch instruction are not identified in the second-level branch target buffer or the first-level branch target buffer, enter a waiting state to wait for an execution result of the first branch instructions.

5. The instruction processing device according to clause 1, wherein the instruction fetch unit further comprises circuitry configured to:
    determine whether there is a performance loss when an instruction stream similar to the first branch instruction is executed; and
    add the one or more entries corresponding to the first branch instruction into the first-level branch target buffer when it is determined that there is a performance loss when the instruction stream similar to the first branch instructions is executed.

6. The instruction processing device according to clause 5, wherein the instruction fetch unit further includes circuitry configured to determine whether there is a performance loss when an instruction stream similar to the first branch instruction is executed according to whether at least a pre-set number of instructions are stored in an instruction cache register.

7. The instruction processing device according to any of clauses 1-6, wherein the first-level branch target buffer adopts a register structure such that entries are searched through a tag comprising a program pointer (PC); and the second-level branch target buffer uses a memory implemented with a multi-way set-associative structure and entries are searched using a hardware index comprising a PC to retrieve entries.

8. The instruction processing device according to any of clauses 1-7, wherein the one or more entries of the first branch instruction comprise: a branch instruction address and a jump target address.

9. The instruction processing device according to any of clauses 1-8, wherein the entries of the first plurality of branch instructions are contained in entries of the second plurality of branch instructions.

10. The instruction processing device according to any of clauses 1-9, wherein for the first branch instruction, the instruction fetch unit simultaneously searches the second-level branch target buffer and the first-level branch target buffer.

11. An instruction processing method, comprising:
    for a first branch instruction, searching a first-level branch target buffer and a second-level branch target buffer, wherein entries in the first-level branch target buffer are accessed faster than entries in the second-level branch target buffer;
    in accordance with determining that one or more entries corresponding to the first branch instruction are identified in the second-level branch target buffer, adding the one or more entries corresponding to the first branch instruction into the first-level branch target buffer; and
    adding the one or more entries corresponding to the first branch instruction into the second-level branch target buffer according to an execution result of the first branch instruction.

12. The instruction processing method according to clause 11, further comprising: updating the one or more entries corresponding to the first branch instruction in the second-level branch target buffer according to the execution result of the first branch instructions.

13. The instruction processing method according to clause 11, wherein the adding the one or more entries corresponding to the first branch instruction into the first-level branch target buffer comprises:
determining whether there is a performance loss when an instruction stream similar to the first branch instruction is executed; and
in accordance with determining that there is a performance loss when the instruction stream similar to the first branch instruction is executed, adding the one or more entries corresponding to the first branch instruction into the first-level branch target buffer.

14. The instruction processing method according to clause 11, wherein the first-level branch target buffer adopts a register structure such that entries are searched through a tag comprising a PC; and the second-level branch target buffer uses a memory implemented with a multi-way set-associative structure and entries are searched using a hardware index comprising a PC to retrieve entries.

15. The instruction processing method according to any of clauses 11-14, wherein the one or more entries of the first branch instruction comprise: a branch instruction address and a jump target address.

16. The instruction processing method according to any of clauses 11-15, wherein the entries of the first plurality of branch instructions in the first-level branch target buffer are contained in the entries of the second plurality of branch instructions in the second-level branch target buffer.

17. The instruction processing method according to any of clauses 11-16, wherein for the first branch instruction, the second-level branch target buffer and the first-level branch target buffer are simultaneously searched.

18. The instruction processing method according to clause 13, wherein the determining whether there is a performance loss when the instruction stream similar to the first branch instruction is executed comprises:
determining whether there is a performance loss when the instruction stream similar to the first branch instruction is executed according to whether at least a pre-set number of instructions are stored in an instruction cache register.

19. A computer system comprising:
an instruction processing device comprising:
a first-level branch target buffer, configured to store entries of a first plurality of branch instructions;
a second-level branch target buffer, configured to store entries of a second plurality of branch instructions, wherein the entries in the first-level branch target buffer are accessed faster than the entries in the second-level branch target buffer;
an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer; and
an execution unit including circuitry configured to execute the first branch instruction.

20. A system-on-chip comprising:
the instruction processing device comprising:
a first-level branch target buffer, configured to store entries of a first plurality of branch instructions;
a second-level branch target buffer, configured to store entries of a second plurality of branch instructions, wherein the entries in the first-level branch target buffer are accessed faster than the entries in the second-level branch target buffer;
an instruction fetch unit coupled to the first-level branch target buffer and the second-level branch target buffer, the instruction fetch unit including circuitry configured to add, for a first branch instruction, one or more entries corresponding to the first branch instruction into the first-level branch target buffer when the one or more entries corresponding to the first branch instruction are identified in the second-level branch target buffer; and
an execution unit including circuitry configured to execute the first branch instruction.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The above are only preferred embodiments of the present disclosure and are not intended to limit the present disclosure. For those skilled in the art, the present disclosure may have various modifications and changes. Any modification, equivalent replacement, improvement, etc. made within the spirit and principle of the present disclosure should be included in the scope of protection of the present disclosure.

The invention claimed is:

1. An instruction processing device, comprising:
a first-level branch target buffer, configured to store entries of a first plurality of branch instructions;
a second-level branch target buffer, configured to store entries of a second plurality of branch instructions, wherein the entries in the first-level branch target buffer are accessed faster than the entries in the second-level branch target buffer;
an instruction fetch unit coupled to the first-level branch target buffer and the second-level branch target buffer, the instruction fetch unit including circuitry configured to:
simultaneously search the first-level branch target buffer and the second-level branch target buffer for one or more entries corresponding to the first branch instruction;
if the one or more entries corresponding to the first branch instruction are found in the first-level branch target buffer, fetch a next instruction based on a target address in the one or more entries;
if the one or more entries corresponding to the first branch instruction are not found in the first-level branch target buffer,
determine whether there is a performance loss according to whether at least a pre-set number of instructions are stored in an instruction cache register; and
if it is determined that there is the performance loss, add the one or more entries corresponding to the first branch instruction into the first-level branch target buffer; and
an execution unit including circuitry configured to execute the first branch instruction.

2. The instruction processing device according to claim 1, wherein the instruction fetch unit or the execution unit includes circuitry configured to add the one or more entries corresponding to the first branch instruction into the second-level branch target buffer according to an execution result of the first branch instruction.

3. The instruction processing device according to claim 1, wherein the instruction fetch unit or the execution unit includes circuitry configured to update the one or more entries corresponding to the first branch instruction in the second-level branch target buffer according to an execution result of the first branch instruction.

4. The instruction processing device according to claim 1, wherein the instruction fetch unit further comprises circuitry configured to: when the one or more entries corresponding to the first branch instruction are not identified in the second-level branch target buffer or the first-level branch target buffer, enter a waiting state to wait for an execution result of the first branch instruction.

5. The instruction processing device according to claim 1, wherein the first-level branch target buffer adopts a register structure such that entries are searched through a tag comprising a program pointer (PC); and the second-level branch target buffer uses a memory implemented with a multi-way set-associative structure and entries are searched using a hardware index comprising a PC to retrieve entries.

6. The instruction processing device according to claim 1, wherein the one or more entries of the first branch instruction comprise: a branch instruction address and a jump target address.

7. The instruction processing device according to claim 1, wherein the entries of the first plurality of branch instructions are contained in entries of the second plurality of branch instructions.

8. An instruction processing method, comprising:
simultaneously searching a first-level branch target buffer and a second-level branch target buffer for one or more entries corresponding to a first branch instruction, wherein entries in the first-level branch target buffer are accessed faster than entries in the second-level branch target buffer;
if the one or more entries corresponding to the first branch instruction are found in the first-level branch target buffer, fetch a next instruction based on a target address in the one or more entries;
if the one or more entries corresponding to the first branch instruction are not found in the first-level branch target buffer, determine whether there is a performance loss according to whether at least a pre-set number of instructions are stored in an instruction cache register; and
if it is determined that there is the performance loss, add the one or more entries corresponding to the first branch instruction into the first-level branch target buffer.

9. The instruction processing method according to claim 8, further comprising: updating the one or more entries corresponding to the first branch instruction in the second-level branch target buffer according to the execution result of the first branch instruction.

10. The instruction processing method according to claim 8, wherein the first-level branch target buffer adopts a register structure such that entries are searched through a tag comprising a PC; and the second-level branch target buffer uses a memory implemented with a multi-way set-associative structure and entries are searched using a hardware index comprising a PC to retrieve entries.

11. The instruction processing method according to claim 8, wherein the one or more entries of the first branch instruction comprise: a branch instruction address and a jump target address.

12. The instruction processing method according to claim 8, wherein the entries of the first plurality of branch instructions in the first-level branch target buffer are contained in the entries of the second plurality of branch instructions in the second-level branch target buffer.

13. A computer system, comprising:
at least one processor;
a memory; and
an instruction processing device, comprising:
    a first-level branch target buffer, configured to store entries of a first plurality of branch instructions;
    a second-level branch target buffer, configured to store entries of a second plurality of branch instructions, wherein the entries in the first-level branch target buffer are accessed faster than the entries in the second-level branch target buffer;
    an instruction fetch unit coupled to the first-level branch target buffer and the second-level branch target buffer, the instruction fetch unit including circuitry configured to:
        simultaneously search the first-level branch target buffer and the second-level branch target buffer for one or more entries corresponding to the first branch instruction;
        if the one or more entries corresponding to the first branch instruction are found in the first-level branch target buffer, fetch a next instruction based on a target address in the one or more entries;
        if the one or more entries corresponding to the first branch instruction are not found in the first-level branch target buffer,
        determine whether there is a performance loss according to whether at least a pre-set number of instructions are stored in an instruction cache register; and
        if it is determined that there is the performance loss, add the one or more entries corresponding to the first branch instruction into the first-level branch target buffer; and
    an execution unit including circuitry configured to execute the first branch instruction.

14. A system-on-chip comprising:
the instruction processing device comprising:
    a first-level branch target buffer, configured to store entries of a first plurality of branch instructions;
    a second-level branch target buffer, configured to store entries of a second plurality of branch instructions, wherein the entries in the first-level branch target buffer are accessed faster than the entries in the second-level branch target buffer;
    an instruction fetch unit coupled to the first-level branch target buffer and the second-level branch target buffer, the instruction fetch unit including circuitry configured to:
        simultaneously search the first-level branch target buffer and the second-level branch target buffer for one or more entries corresponding to the first branch instruction;
        if the one or more entries corresponding to the first branch instruction are found in the first-level branch target buffer, fetch a next instruction based on a target address in the one or more entries;

if the one or more entries corresponding to the first branch instruction are not found in the first-level branch target buffer, determine whether there is a performance loss according to whether at least a pre-set number of instructions are stored in an instruction cache register; and if it is determined that there is the performance loss, add the one or more entries corresponding to the first branch instruction into the first-level branch target buffer; and an execution unit including circuitry configured to execute the first branch instruction.

\* \* \* \* \*